US008029311B2

(12) United States Patent
Ohshima et al.

(10) Patent No.: US 8,029,311 B2
(45) Date of Patent: Oct. 4, 2011

(54) FEMALE CONNECTOR STRUCTURE, MALE CONNECTOR STRUCTURE, BATTERY, ADAPTER AND ELECTRIC DEVICE

(75) Inventors: Yuji Ohshima, Kanagawa (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/489,533

(22) Filed: Jun. 23, 2009

(65) Prior Publication Data

US 2009/0325425 A1    Dec. 31, 2009

(30) Foreign Application Priority Data

Jun. 25, 2008   (JP) ............................... P2008-166310

(51) Int. Cl.
*H01R 13/64* (2006.01)

(52) U.S. Cl. ....................................................... 439/374

(58) Field of Classification Search .................. 439/274, 439/276, 928, 929, 374, 376; 310/50
See application file for complete search history.

(56) References Cited

U.S. PATENT DOCUMENTS

| | | | | |
|---|---|---|---|---|
| 2,911,612 A * | 11/1959 | Jackson et al. | ................. | 439/637 |
| 4,431,245 A * | 2/1984 | Jigamian et al. | ............... | 439/344 |
| 4,578,628 A * | 3/1986 | Siwiak | ........................... | 320/127 |
| 4,590,943 A * | 5/1986 | Paull et al. | ......................... | 607/5 |
| 4,616,169 A * | 10/1986 | Proffitt | ............................ | 320/111 |
| 5,009,384 A * | 4/1991 | Gerke et al. | .................... | 248/343 |
| 5,369,565 A * | 11/1994 | Chen et al. | ..................... | 363/146 |
| 5,554,042 A * | 9/1996 | Denninger | ..................... | 439/272 |
| 5,605,150 A * | 2/1997 | Radons et al. | ................. | 600/300 |
| 5,674,094 A * | 10/1997 | Hutchinson et al. | .......... | 439/680 |
| 5,744,934 A * | 4/1998 | Wu | ................................. | 320/111 |
| 6,086,419 A * | 7/2000 | Marpoe, Jr. | .................... | 439/595 |
| 6,123,565 A * | 9/2000 | Bierek et al. | .................. | 439/377 |
| 6,413,123 B1 * | 7/2002 | Kirkendall | ..................... | 439/680 |
| 6,590,563 B1 * | 7/2003 | Oross et al. | .................... | 345/163 |
| 6,702,604 B1 * | 3/2004 | Moscovitch | ................... | 439/374 |
| 6,729,413 B2 * | 5/2004 | Turner et al. | ................... | 173/217 |
| 6,840,335 B1 * | 1/2005 | Wu | ................................. | 173/217 |
| 6,965,214 B2 * | 11/2005 | Kubale et al. | ................... | 320/114 |
| 7,125,270 B2 * | 10/2006 | Buck et al. | ..................... | 439/155 |
| 7,157,180 B2 * | 1/2007 | Lui et al. | ......................... | 429/100 |
| 7,182,150 B2 * | 2/2007 | Grossman | ..................... | 173/198 |
| 7,201,597 B2 * | 4/2007 | Hong et al. | .................... | 439/352 |
| 7,243,734 B2 * | 7/2007 | Wu | ................................. | 173/217 |
| D568,239 S * | 5/2008 | Okada et al. | ................. | D13/103 |
| 7,659,694 B2 * | 2/2010 | Griffin | ........................... | 320/114 |
| 7,883,360 B2 * | 2/2011 | Hirt | ................................ | 439/500 |

(Continued)

FOREIGN PATENT DOCUMENTS

DE    10 2005 009 098        9/2006

(Continued)

*Primary Examiner* — Neil Abrams
(74) *Attorney, Agent, or Firm* — Frommer Lawrence & Haug LLP; Williams S. Frommer; Thomas F. Presson (57) ABSTRACT

A female connector structure includes a plurality of pin insertion holes arranged in a row to correspond to a plurality of columnar connector pins arranged in a male connector section and adapted to receive the respective connector pins individually inserted thereinto. A pair of connector inner walls is formed externally of the pin insertion holes of opposite ends extending in a depth direction of the pin insertion holes. A pair of grooves is formed on an inner surface of the connector inner wall to be gradually shallower as the groove goes from an opening side of the pin insertion hole toward a deepest side thereof.

12 Claims, 8 Drawing Sheets

U.S. PATENT DOCUMENTS

| | | | |
|---|---|---|---|
| 2001/0003073 A1 | 6/2001 | Endo | |
| 2005/0226741 A1* | 10/2005 | Huang | 417/411 |
| 2007/0072462 A1* | 3/2007 | Nakano et al. | 439/157 |

FOREIGN PATENT DOCUMENTS

| | | |
|---|---|---|
| EP | 1 732 171 | 12/2006 |
| JP | 3399055 | 2/2003 |
| JP | 3404951 | 3/2003 |
| JP | 3508188 | 1/2004 |
| JP | 3528844 | 3/2004 |
| JP | 2004-159374 | 6/2004 |
| JP | 3632688 | 1/2005 |
| JP | 3693110 | 7/2005 |
| JP | 3778202 | 3/2006 |

* cited by examiner

FEMALE CONNECTOR STRUCTURE, MALE CONNECTOR STRUCTURE, BATTERY, ADAPTER AND ELECTRIC DEVICE

BACKGROUND OF THE INVENTION

1. Field of the Invention

The present invention relates to a female connector structure, a male connector structure, a battery, an adaptor and an electric device suitably applied to e.g. a video camera. More specifically, the invention relates to a technology of easily attaching a battery and an adaptor to a video camera or the like. In addition, the invention relates to a technology of reducing a load applied to the connector pin of a male connector section, the load resulting from an external force in a direction of pulling off an attached battery or adaptor from a video camera or the like.

2. Description of the Related Art

Video cameras have been designed so as to be removably attached with a battery or adaptor and to receive electricity supplied thereto from the battery or adaptor. In this case, the video camera and the battery or adaptor are electrically connected to each other by fitting a male connector section provided on one of them to a female connector section provided on the other. Specifically, a plurality of columnar connector pins arranged on the male connector section are individually inserted into respective pin insertion holes of the female connector section to thereby establish conduction between the male connector section and the female connector section.

The battery or the like is repeatedly attached to a video camera. At the time of attachment, the connector pins of the male connector section have to be inserted into the corresponding pin insertion holes of the female connector section. It is necessary to secure the battery or the like attached to the video camera in such a manner that the connector pins inserted into the pin insertion holes will not break or bend.

To meet the necessity, an adaptor and a battery are disclosed which are designed to execute smooth joint between the male connector section and the female connector section (insertion of the connector pins into pin insertion holes). Specifically, there are provided a projecting side member fitted to a recessed side member provided on the rear surface of a video camera body; and a female side member fitted to a male side member composed of a plurality of vertical connector pins and provided on the rear surface of the video camera body. The female side member has a downward-facing lower surface formed with a plurality of vertical pin-insertion holes adapted to receive the connector pins inserted thereinto. At the time of attachment to the video camera, the downward movement due to its own weight resulting from the fit between the recessed side member and the projecting side member allows the pin insertion holes to be inserted to the connector pins. (See e.g. Japanese Patent No. 3,778,202.)

An attachment side attachment mechanism portion is disclosed in which when a battery or the like is removably attached directly to the attachment surface of a video camera, the attachment and detachment can be done easily and the reliability of the attachment can be enhanced. Specifically, the attachment side attachment mechanism portion adapted to mechanically and electrically join a battery side attachment mechanism portion to the attachment surface in a removably manner includes a connector, a fitting portion with locking mechanism and a pair of guide means. The connector is electrically and removably connected to a downward-facing electric terminal provided on a battery by moving the front surface of the battery provided with the battery side attachment mechanism portion, from the upside to the downside along the attachment surface. The fitting portion with locking mechanism includes an attachment surface side tapered guide and a locking means. The attachment surface side tapered guide is adapted to guide a fitting portion as a battery side attachment mechanism portion so as to center the battery side electric terminal with respect to the connector when the front surface of the battery is moved from the upside to the downside along the attachment surface. The locking means is adapted to engage with the fitting portion as the battery side attachment mechanism portion to lock the battery to the attachment surface. The pair of guide means are disposed on the attachment surface and on both the right and left sides of the connector, and when the battery is attached or removed, guide a to-be-guided means provided on the battery side to prevent the entrapment of the battery along with the to-be-guided means. (See Japanese Patent No. 3,528,844.)

Further, FIG. 1 in Japanese Patent Nos. 3,399,055, 3,508,188, and 3,632,688, illustrates a male connector section (a male side member 142 of a connector 14) and FIG. 2 and FIG. 3B illustrate the relationship between the connector 14 and a battery pack 11. Specifically, a pair of right and left vertical guide projections 148 are formed parallel to the rear surface 2d of a video camera body on both the right and left lateral edges of the male side member 142 of the connector 14. On the other hand, a pair of right and left vertical guide grooves 149 are respectively formed on both right and left sides of a female connector section (a female side member 144 of the connector 14). In addition, the guide projections 148 are fitted to the respective guide grooves 149. Also FIGS. 6, 7 and 8B in Japanese Patent Nos. 3,404,951 and 3,693,110 disclose the same connector 14. Incidentally, also FIGS. 1, 2 and 3B in Japanese Patent Nos. 3,778,202 and 3,528,844 mentioned above disclose the same connector 14.

SUMMARY OF THE INVENTION

However, the projection (the guide projection 148 formed on the male side member 142 of the connector 14) of the male connector section described in the figures of Japanese Patent Numbers mentioned above is formed rectangular as viewed from above. Similarly, also the groove (the guide groove 149 formed on the female side member 144 of the connector 14) of the female connector section is formed rectangular. Thus, if the male connector section and the female connector section are only slightly misaligned with each other, then the rectangular end face of the projection (the guide projection 148) comes into planar contact with the wall surface on the peripheries of the groove (the guide groove 149). Consequently, the battery or adaptor may not be attached to the video camera. (In other words, the guide groove 149 may not be fitted to the guide projection 148.)

In this case, if the gap between the projection (the guide projection 148) and the groove (the guide groove 149) is large, the battery and the like can be attached relatively easily. However, if so, the battery and the like thus attached may cause backlash, that is, securing of the battery and the like to the video camera becomes insufficient. As a result, a large load is applied to the connector pin (the connector pin 141) of the male connector section inserted into the pin insertion port (the pin insertion hole 143) of the female connector portion, so that the connector may be broken or bent.

Accordingly, it is desirable that a battery or an adaptor can easily be attached to a video camera or the like and a load applied to a connector pin can be reduced.

According to an embodiment of the present invention, there is provided a female connector structure including: a plurality of pin insertion holes arranged in a row to correspond to a plurality of columnar connector pins arranged in a male connector section and adapted to receive the respective connector pins individually inserted thereinto; a pair of connector inner walls formed externally of the pin insertion holes of both ends so as to extend in a depth direction of the pin insertion holes; and a pair of grooves each formed on an inner surface of the connector inner wall so as to be gradually shallower as the groove goes from an opening side of the pin insertion hole toward a deepest side thereof in such a manner as to receive a projection, fitted thereinto, provided on the male connector section.

According to another embodiment of the present invention, there is provided a female connector structure including: a plurality of pin insertion holes arranged in a row to correspond to a plurality of columnar connector pins arranged in a male connector section and adapted to receive the respective connector pins individually inserted thereinto; a pair of connector inner walls formed externally of the pin insertion holes of opposite ends so as to extend in a depth direction of the pin insertion holes; and a pair of projections each formed in an inner surface of each of the connector inner walls so as to be gradually increased in height as it goes from an opening side of the pin insertion holes toward a deepest side thereof in such a manner as to be fitted into a groove formed in the male connector section.

According to still another embodiment of the present invention, there is provided a male connector structure including: a plurality of columnar connector pins arranged in a row so as to correspond to a plurality of pin insertion holes arranged in a female connector section and adapted to be individually inserted into the respective connector holes; a pair of connector outer walls formed externally of the connector pins of opposite ends so as to extend in a length direction of the connector pins; and a pair of projections each formed on an external surface of the connector external wall so as to be gradually increased in height as the projection goes from a tip side of the connector pin toward a root side thereof so that the projection is fitted into the groove provided on the female connector section.

According to yet another embodiment of the present invention, there is provided a battery including: a battery body serving as an electric power supply for an external electric device; and a female connector section removably attachable to a male connector section of the electric device and electrically connected to the battery body; wherein the female connector section includes a plurality of pin insertion holes arranged in a row to correspond to a plurality of columnar connector pins arranged in a male connector section and adapted to receive the respective connector pins individually inserted thereinto; a pair of connector inner walls formed externally of the pin insertion holes of opposite ends so as to extend in a depth direction of the pin insertion holes; and a pair of grooves each formed on an inner surface of the connector inner wall so as to be gradually shallower as the groove goes from an opening side of the pin insertion hole toward a deepest side thereof in such a manner as to receive a projection, fitted thereinto, provided on the male connector section.

According to yet another embodiment of the present invention, there is provided an adaptor including: an adaptor body adapted to receive electricity of a commercial power source and output electricity of a type adjusted to an external electric device; and a female connector section removably attachable to a male connector section of the electric power supply and electrically connected to the adaptor body; wherein the female connector section includes a plurality of pin insertion holes arranged in a row to correspond to a plurality of columnar connector pins arranged in a male connector section and adapted to receive the respective connector pins individually inserted thereinto; a pair of connector inner walls formed externally of the pin insertion holes of opposite ends so as to extend in a depth direction of the pin insertion holes; and a pair of grooves each formed on an inner surface of the connector inner wall so as to be gradually shallower as the groove goes from an opening side of the pin insertion hole toward a deepest side thereof in such a manner as to receive a projection, fitted thereinto, provided on the male connector section.

According to yet another embodiment of the present invention, there is provided an electric device including: an electrically-driven drive portion; and a male connector section removably attachable with a female connector section of a battery serving as an electric power source and electrically connected to the drive portion; wherein the male connector section includes a plurality of columnar connector pins arranged in a row so as to correspond to a plurality of pin insertion holes arranged in a female connector section and adapted to be individually inserted into the respective pin insertion holes; a pair of connector outer walls formed externally of the connector pins of opposite ends so as to extend in a length direction of the connector pins; and a pair of projections each formed on an external surface of the connector external wall so as to be gradually increased in height as the projection goes from a tip side of the connector pin toward a root side thereof so that the projection is fitted into the groove provided on the female connector section.

In the above-described embodiments of the present invention, the grooves provided on the female connector section side are fitted to the respective projections provided on the male connector section side. The grooves are each formed so as to be gradually shallower as it goes from the opening side of the pin insertion holes toward the deepest side thereof. Thus, when the male connector section and the female connector section are attached to each other, the projection enters the deep side of the groove (the side having a larger gap between the groove and the projection) and then moves toward the shallower side of the groove (the side having a small gap between the groove and the projection). The projection is gradually increased in height as it goes from the tip side of the connector pin toward the root side. Thus, when the male connector section and the female connector section are attached to each other, the groove enters the low side of the projection (the side having a large gap between the projection and the groove) and then moves toward the high side (the side having a small gap between the projection and the groove).

According to the invention, the projection enters from the deep side of the groove (the side having the large gap between the projection and the groove) and the groove enters from the low side of the projection (the side having the large gap between the groove and the projection). Thus, the projection and the groove can easily be fitted to each other without increasing the gap between the projection and the groove. Consequently, the projection thus fitted is restrained by the groove having the small gap between the projection and the groove so that backlash between the projection and the groove is prevented.

DETAILED DESCRIPTION OF THE PREFERRED EMBODIMENTS

Preferred embodiments of the present invention will be described with reference to the drawings.

The following embodiments will describe a video camera 10 provided with a male connector section 30 as an electric device of the present invention by way of example. A battery pack 20 (including a battery body of the embodiments of the present invention) and an adapter pack 90 (including an adaptor body in the embodiments of the present invention) are each provided with a female connector section 40 and are attached to the video camera 10 for use (by joining the male connector section 30 to the female connector section 40).

Figure 1A:
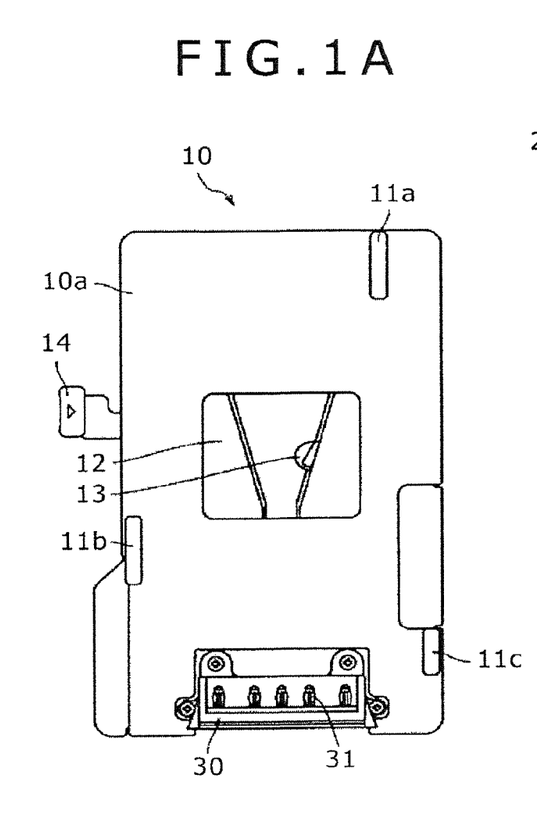
FIG. 1A is a front view illustrating an attachment surface of a video camera according to an embodiment.
Figure 1B:
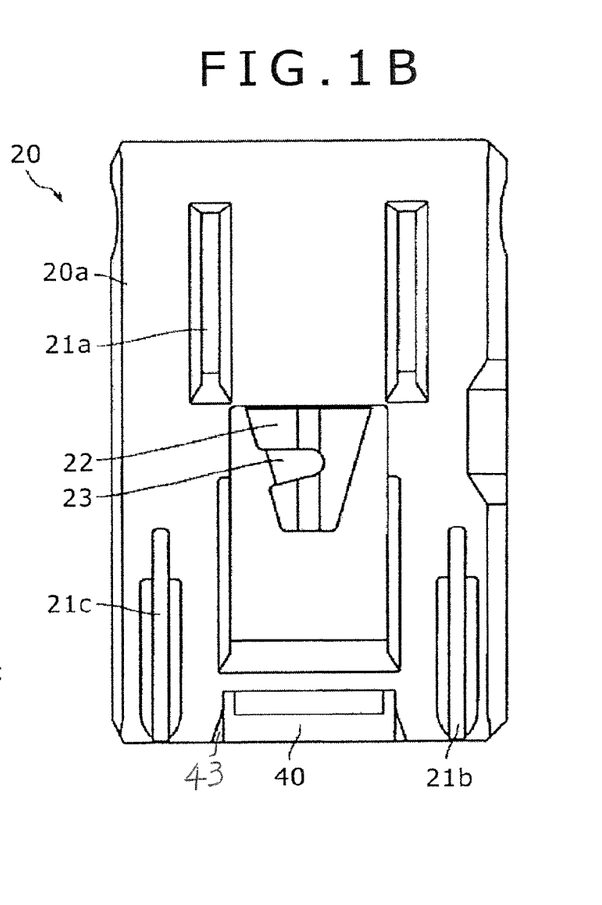
FIG. 1B is a front view illustrating an attachment surface of a battery pack according to the embodiment.

FIG. 1A is a front view illustrating an attachment surface of the video camera 10 (a rear surface 10a of the video camera 10) according to an embodiment. FIG. 1B is a front view illustrating an attachment surface of the battery pack 20 (a front surface 20a of the battery pack 20) according to the present embodiment.

Referring to FIG. 1A, the video camera 10 has guide projections 11a, 11b and 11c at an upper right portion, a lower left portion and a lower right portion, respectively, on the rear surface 10a serving as the attachment surface for the battery pack 20. In addition, the video camera 10 has a lock recessed section 12 and a locking claw 13 at the central portion of the rear surface 10a. A releasing lever 14 for the locking claw 13 projects from a lateral surface of the video camera 10. Further, the video camera 10 includes at the lower portion of the rear surface 10a the male connector section 30 in which a plurality of columnar connector pins 31 are arranged. Incidentally, the locking claw 13 is biased by a spring (not illustrated) to normally project from the locking recessed section 12. Since the locking claw 13 is interlocked with the releasing lever 14, the releasing lever 14 is depressed against the biasing force of the spring to pull the locking claw 13 into the locking recessed section 12.

On the other hand, the battery pack 20 is formed in a flat rectangular parallelepiped that houses a battery body (not illustrated) composed of a rechargeable lithium battery therein. The battery pack 20 is formed with guide grooves 21a, 21b and 21c at an upper left portion, a right lower portion and a lower left portion, respectively, on the front surface 20a serving as an attachment surface. The battery pack 20 has a locking projection 22 and a locking groove 23 at the central portion of the front surface 20a. Further, the battery pack 20 is provided with the female connector section 40 at the lower portion of the front surface 20a. The female connector section 40 is removably attached to the male connector section 30 of the video camera 10 and is electrically connected to the batter body. Incidentally, the battery pack 20 has a groove, similar to the guide groove 21a, formed at the upper right portion of the front surface 20a.

The guide grooves 21a, 21b and 21c of the battery pack 20 are located so as to correspond to the guide projections 11a, 11b and 11c, respectively, of the video camera 10. The locking projection 22 and the locking groove 23 are located so as to correspond to the locking recessed section 12 and the locking claw 13, respectively. Further, the female connector section 40 is located to correspond to the male connector section 30. In this way, the front surface 20a of the battery pack 20 can mechanically and electrically be attached to and removed from the rear surface 10a of the video camera 10. The battery body (not illustrated) in the battery pack 20 attached to the video camera 10 serves as an electric source for the drive portion of the video camera 10.

To attach the battery pack 20 to the video camera 10, the battery pack 20 is first grasped with a hand, and while the female connector section 40 is located above the male connector section 30, the front surface 20a of the battery pack 20 is made to overlap the rear surface 10a of the video camera 10. At this time, the guide projections 11a, 11b and 11c are made to be fitted into the guide grooves 21a, 21b and 21c, respectively. Incidentally, the guide grooves 21a, 21b and 21c are each formed to have slopes on both right and left sides thereof. Therefore, even if the video camera 10 and the battery pack 20 are positioned slightly offset from each other, the rear surface 10a and the front surface 20a exactly conform to each other.

Next, while the front surface 20a of the battery pack 20 overlaps the rear surface 10a of the video camera 10, the battery pack 20 is pulled down. Thus, the battery pack 20 is guided by the guide projections 11a, 11b and 11c of the video camera 10 so that locking projection 22 is led to enter the locking recessed section 12. In this case, the locking projection 22 is automatically centered by the right and left tapered portions of the locking recessed section 12 and at the same time, the locking claw 13 is compressed into the locking recessed section 12. Further, the female connector section 40 is inserted into the male connector section 30, that is, both are joined together.

In this way, the female connector section 40 and the male connector section 30 are joined together to allow the connector pins 31 to complete the electric connection. At this position, the locking claw 13 and the locking groove 23 correspond to each other. The locking claw 13 that has been compressed into the locking recessed section 12 by the tapered portions of the locking projection 22 automatically returns by the biasing force of the spring (not illustrated) and is fitted into the locking groove 23. Thus, the video camera 10 and the battery pack 20 establish electrical and mechanical connection therebetween, completing the attachment of the battery pack 20. Consequently, the electric power is supplied to the video camera 10 from the battery pack 20, whereby the drive portion (not illustrated) of the video camera 10 can electrically be driven.

Reversely, to remove the battery pack 20 from the video camera 10, the release lever 14 projecting from the lateral surface of the video camera 10 needs only to be compressed by a finger. Thus, the locking claw 13 is pulled into the locking recessed section 12 in conjunction with the release lever 14 and disengaged from the locking groove 23. Then, while the release lever 14 remaining compressed, the battery pack 20 is grasped by a hand, and the battery pack 20 is pulled up along the rear surface 10a of the video camera 10 as it is. Consequently, while being guided by the guide projections 11a, 11b, 11c, the battery pack 20 is moved upward so that the locking projection 22 is disengaged from the locking recessed section 12 and also the female connector section 40 is disengaged from the male connector section 30. In this way, the battery pack 20 can be removed from the video camera 10.

As described above, the battery pack 20 is designed to be detachably attached to the video camera 10. When the battery pack 20 is attached to the video camera 10, the guide projections 11a, 11b and 11c are fitted to the guide grooves 21a, 21b and 21c, respectively. In addition, the locking projection 22 is centered by the right and left tapered portions of the locking recessed section 12. Thus, the male connector section 30 and the female connector section 40 can be subjected to alignment.

However, displacement may occur between the male connector section 30 and the female connector section 40. In such a case, when the male connector section 30 is inserted into the female connector section 40, an external force caused by the displacement therebetween applies a large load to the connector pins 31. After the attachment of the battery pack 20 to the video camera 10 is repeated, the connector pins 31 may finally be subjected to fatigue breakdown.

After the battery pack 20 has been attached to the video camera 10, the mechanical joint therebetween is maintained by the locking projection 22 and the locking recessed section 12 (the locking claw 13 and the locking groove 23) fitted to each other. The connector pins 31 of the male connector section 30 are being inserted into the female connector section 40. Therefore, when an external force is applied in the direction of pulling off the attached battery pack 20 from the video camera 10, a large load acts on the connector pins 31 even if the locking recessed section 12 and the locking projection 22 are fitted to each other.

Further, if an external force in the arrangement or insertion direction of the connector pins 31 is applied to the battery pack 20, a large load acts on the connector pins 31. However, the male connector section 30 and the female connector section 40 in the present embodiment significantly reduces the load acting on the connector pins 31 even if the external force in the various directions is applied to the battery pack 20.

Figure 2A:
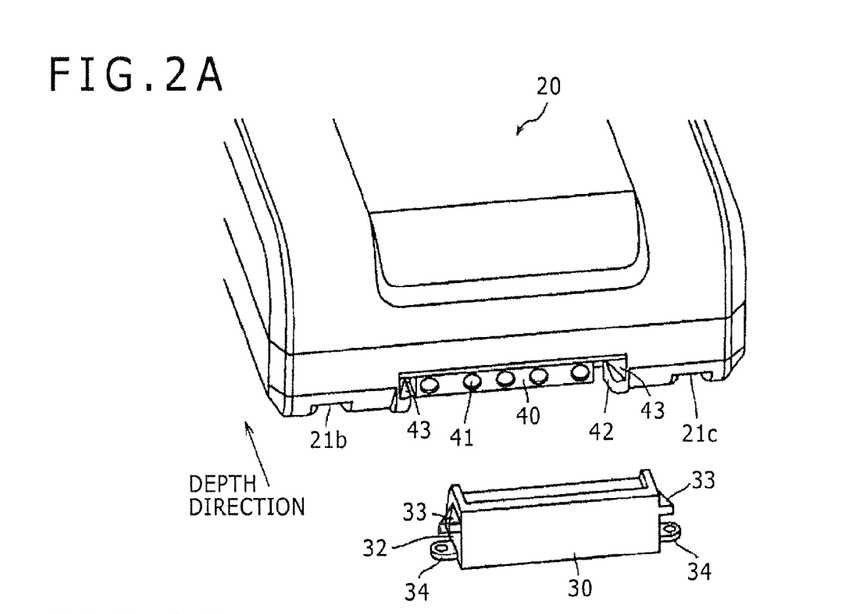
FIG. 2A is a perspective view illustrating a state where a female connector section provided form the battery pack and a male connector section according to the embodiment are disengaged from each other.
Figure 2B:
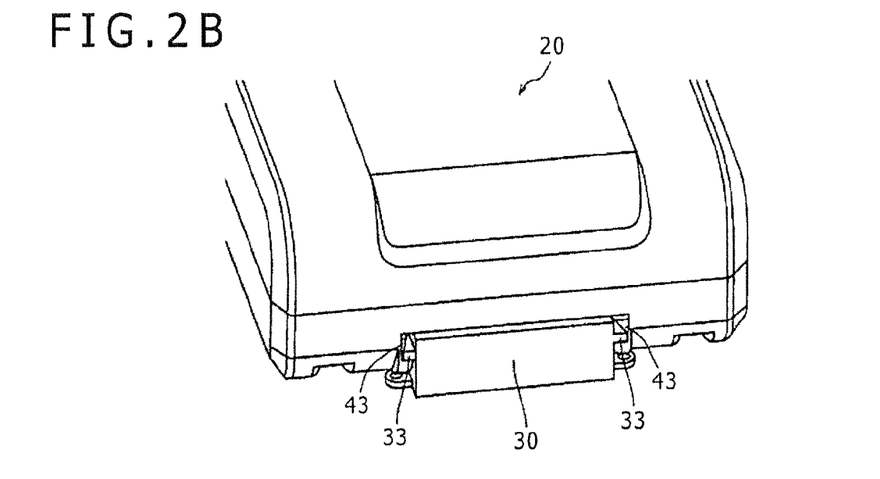
FIG. 2B is a perspective view illustrating a state where the female connector section and the male connector section according to the embodiment are engaged with each other.

FIGS. 2A and 2B are perspective views illustrating attached and removed states, respectively, of the female connector section 40 provided in the battery pack 20 and the male connector section 30 in the embodiment.

Figure 3A:
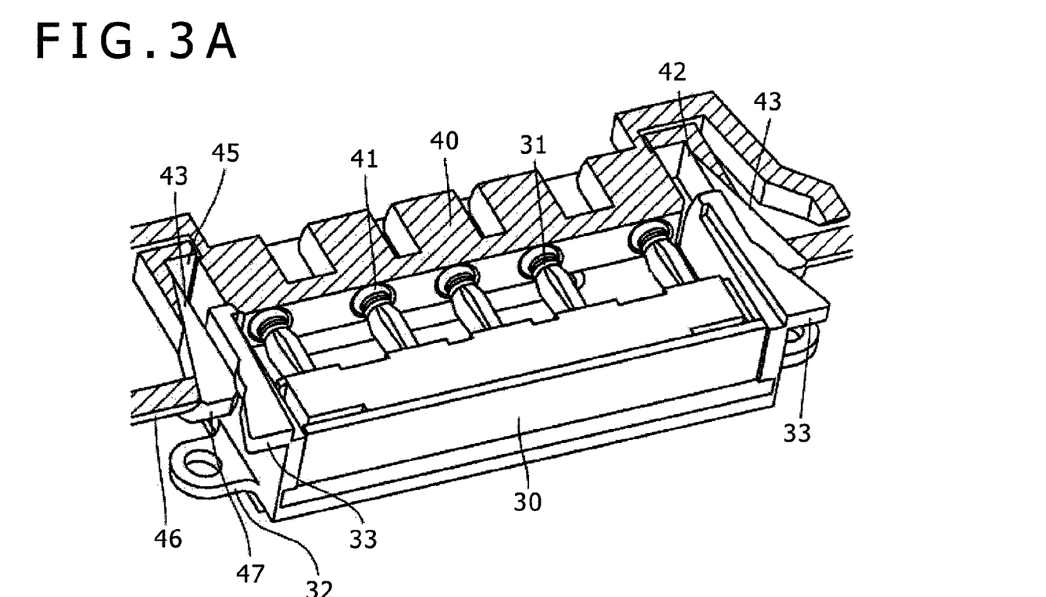
FIGS. 3A and 3B are a perspective view and a front view, respectively, illustrating the relationship between the female connector section and the male connector section according to the embodiment.
Figure 3B:
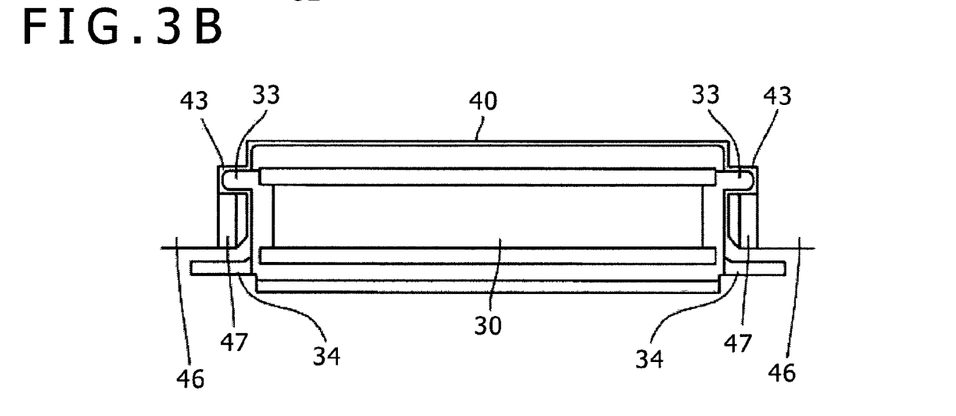

FIGS. 3A and 3B are a perspective view and a front view, respectively, illustrating the relationship between the female connector section 40 and the male connector section 30 in the present embodiment.

Incidentally, although the male connector section 30 is attached to the rear surface 10a of the video camera 10 illustrated in FIG. 1, FIGS. 2A and 2B omit the illustration of the video camera 10. FIG. 3A is a cross-sectional view illustrating the female connector section 40, taken along the plane of the grooves 43, and the male connector section 30 with its upper portion removed.

Referring to FIGS. 2A, 2B, 3A and 3B, the female connector section 40 includes a plurality of pin insertion holes 41, a pair of connector inner walls 42, and a pair of grooves 43. The pin insertion holes 41 are arranged in a row to correspond to the plurality of columnar connector pins 31 (FIG. 3A) arranged in the male connector section 30 and adapted to receive the respective connector pins 31 inserted thereinto. The pair of connector inner walls 42 are formed externally of the pin insertion holes 41 of both ends so as to extend in the depth direction of the pin insertion holes 41. The pair of grooves 43 are each formed on the inner surface of the connector inner wall 42 so as to be progressively shallower it goes from the opening side of each pin insertion hole 41 toward the deepest side thereof in such a manner as to receive a projection 33 provided on the male connector section 30. Incidentally, the grooves 43 are each formed triangular as viewed from a surface parallel to a plane extending through the associated pin insertion hole 41 in the depth direction. In addition, the projection 33 of the male connector section 30 is shaped in a triangle corresponding to the groove 43 of the female connector section 40.

The female connector section 40 has a pair of connector bottom faces 45 (FIG. 3A) which are each located between each of the pin insertion holes 41 of opposite ends and a corresponding one of the connector inner walls 42 so as to extend in the arrangement direction of the pin insertion holes 41. Further, the female connector section 40 has a pair of connector end faces 46 which are located externally of the pin insertion holes 41 of the opposite ends so as to extend in the arrangement direction of the pin insertion holes 41 and to each serve as the end face of the groove 43. The connector end faces 46 are each provided with an abutment portion 47 adapted to receive the projection 33 abutted thereagainst when the projection 33 is not fitted into the groove 43.

On the other hand, the male connector section 30 includes the plurality of columnar connector pins 31 (FIG. 3A), a pair of connector outer walls 32 (FIG. 2A), and the pair of projections 33. The connector pins 31 are arranged in such a row as to correspond to the plurality of pin insertion holes 41 arranged on the female connector section 40 and to be individually insertable into the corresponding pin insertion holes 41. The connector outer walls 32 are formed externally of the connector pins 31 of the opposite ends so as to extend in the longitudinal direction of the connector pins 31. The projections 33 are each formed on the external surface of the connector external wall 32 so as to progressively increase in height as it goes from the tip side of the connector pin 31 toward the root side thereof so that it is fitted into the groove 43 provided on the female connector portion 40 side.

If the female connector section 40 and the male connector section 30 are positionally aligned with each other, when the male connector section 30 is joined to the female connector section 40, the projections 33 are first fitted into the grooves 43. In this case, the groove 43 is formed triangular and the opening side of the pin insertion hole 41 is formed deeper. In addition, the projection 33 is formed triangular and the leading end side of the connector pin 31 is formed lower. In this way, since fit is established between the deep groove 43 and the low projection 33, even if both have the displacement in the arrangement direction of the pin insertion holes 41, they can accommodate the displacement.

Since the groove portion 43 and the projection 33 are each formed triangular, as the female connector section 40 and the male connector section 30 are gradually joined together, centering is achieved such that the center of each of the pin insertion holes 41 and the center of each of the connector pins 31 (FIG. 3A) come close to each other. When the connector pins 31 are inserted into the respective pin insertion holes 41, the projections 33 are restrained from above and below by the respective grooves 43 as shown in FIGS. 2B and 3B.

In this way, while the female connector section 40 and the male connector section 30 are electrically connected to each other, the grooves 43 act as a first restraining portion of the embodiments of the present invention. Specifically, the grooves 43 (the first restraining portion) can restrain to within ±0.22 mm the movement of the connector pins 31 in the direction vertically to the plane extending through the pin insertion holes 41 in the depth direction thereof (FIG. 2A). Incidentally, even if the movement of such a direction is suppressed to within as small as ±0.22 mm, since the displacement of the arrangement direction of the pin insertion holes 41 can be absorbed, the female connector section 40 and the male connector section 30 can be joined together with ease.

Figure 4A:
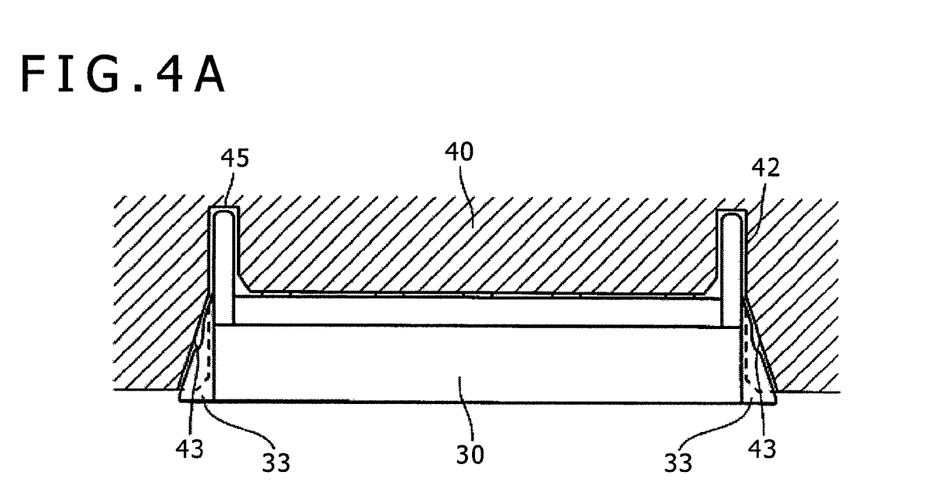
FIG. 4A is a plan view illustrating the relationship between the female connector section and the male connector section according to the embodiment.
Figure 4B:
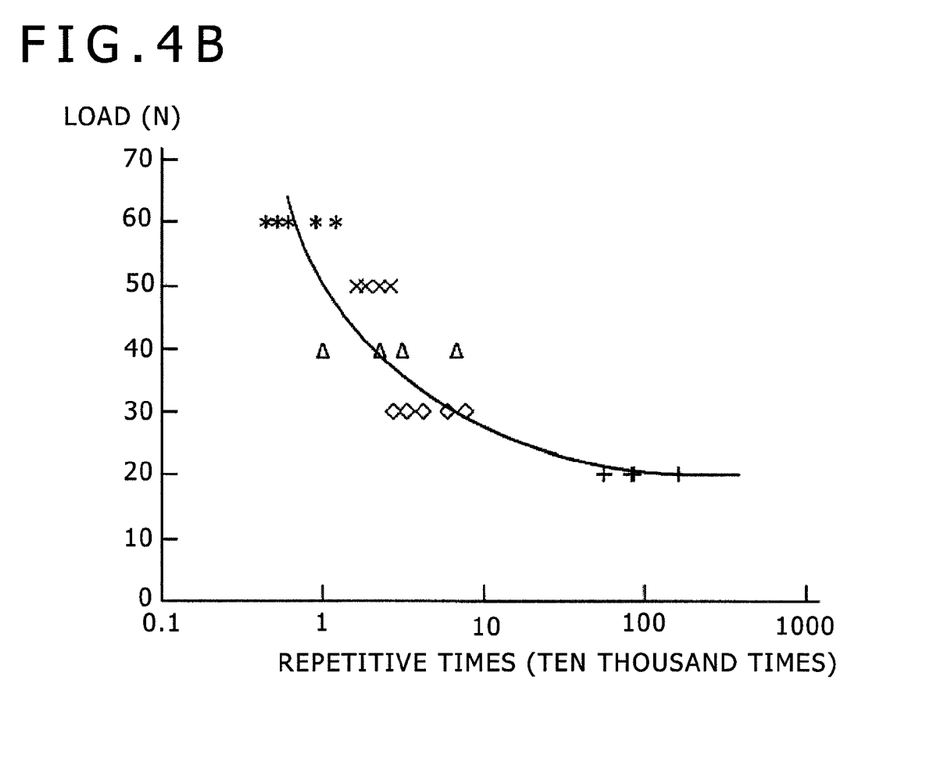
FIG. 4B is a graph illustrating durability of the male connector section.

FIG. 4A is a plan view illustrating the relationship between the female connector section 40 and the male connector section 30 in the present embodiment and FIG. 4B is a graph illustrating durability of the male connector section 30.

Referring to FIG. 4A, if the female connector section 40 and the male connector section 30 are joined together, the leading end of the male connector section 30 reaches the connector bottom faces 45 along the connector inner wall 42 and the connector pins 31 (FIG. 3A) are inserted into the respective pin insertion holes 41 (FIG. 3A). In addition, the triangular grooves 43 and projections 33 are such that their oblique lines of the triangles come close to each other.

Accordingly, the connector bottom faces 45 and the grooves 43 restrain the part of the male connector section 30 so as to suppress to within ±0.22 mm the movement of the connector pins (FIG. 3A) in the depth direction (the upper direction on the sheet of the FIG. 4A) of the pin insertion holes 41 (FIG. 3A). (The connector bottom faces 45 and the grooves 43 serve as a second restraining portion of the embodiments of the present invention.) In addition, the connector inner walls 42 and the grooves 43 restrain the part of the male connector section 30 so as to suppress to within ±0.22 mm the movement of the connector pins 31 in the arrangement direction (the right-left direction on the sheet of the FIG. 4A) of the pin insertion holes 41. (The connector inner walls 42 and the grooves 43 serve as a third restraining portion of the embodiments of the present invention.)

It is experimentally confirmed that if the movement of the connector pins 31 (FIG. 3A) can be suppressed to within ±0.22 mm, the fracture life of the connector pins 31 can be extended significantly (substantially infinitely). Referring to FIG. 4B, concretely, if a load is repeatedly applied to the connector pin 31, when the load is 20 N, repetitive times to reach the fracture of the connector pins 31 is about one million times. When the load is less than 20 N, the repetitive times become close to infinite. In addition, the movement of the connector pins 31 is correlated to the load applied to the connector pins 31. If the movement is within ±0.22 mm, the load is less than 20 N. Thus, in the case of the female connector section 40 and the male connector section 30 according to the present embodiment in which the movement of the connector pins 31 is suppressed to within ±0.22 mm, even if the connector pin 31 are moved in any direction, it will not be fractured.

Figure 5A:
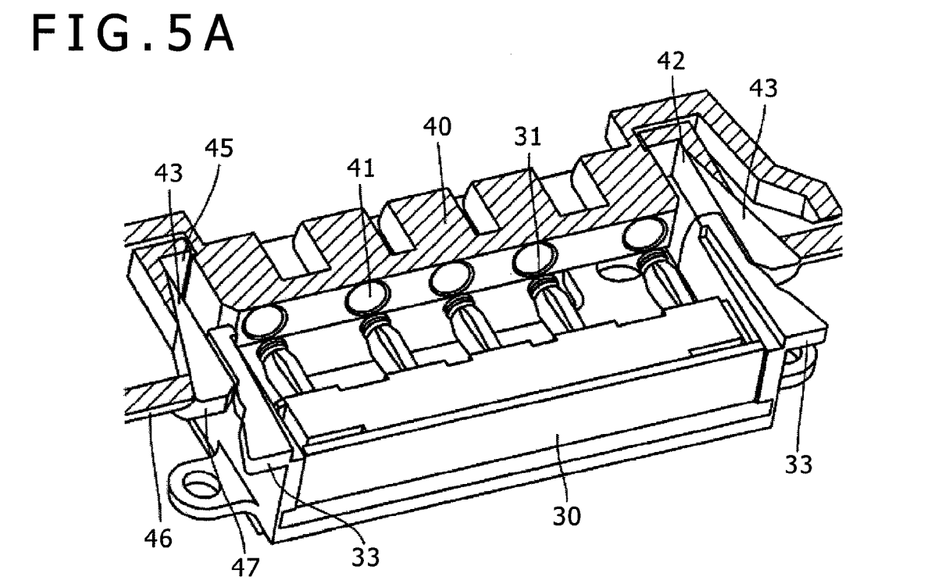
FIGS. 5A and 5B are a perspective view and a front view, respectively, illustrating the displacement between the female connector section and the male connector section according to the embodiment.
Figure 5B:
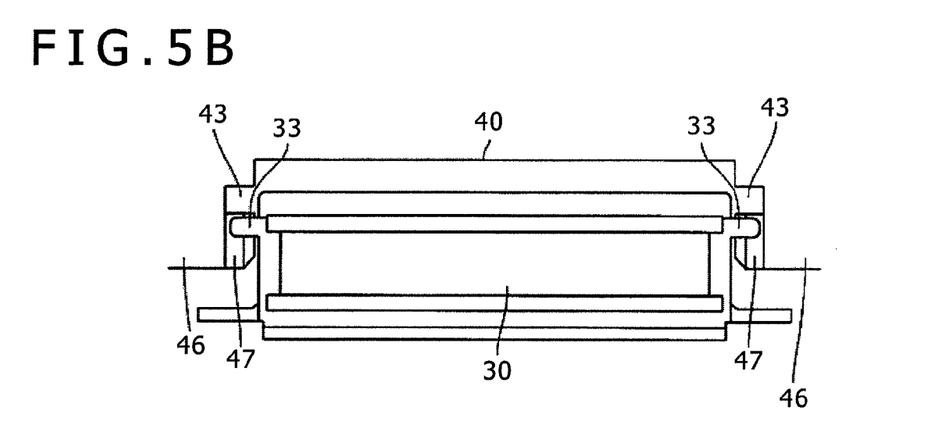

FIGS. 5A and 5B are a perspective view and a front view, respectively, illustrating the displacement state between the female connector section 40 and the male connector section 30 in the present embodiment.

Referring to FIGS. 5A and 5B, the connector end faces 46 is each provided with the abutment portion 47. If the grooves 43 are not aligned with the respective projections 33, the leading end portions of the projections 33 come into contact with the abutment portions 47 before the connector pins 31 are inserted into the respective pin insertion holes 41. Thus, since the connector pins 31 will not collide with the female connector section 40, they can be prevented from being fractured.

The abutment portion 47 is formed like a semicircle extending from the groove 43 to the lower surface of the connector end face 46. Therefore, the projection 33 that has collided with the abutment portion 47 will deflect toward the side opposite the groove 43. Thus, it is easily grasped that the grooves 43 are misaligned with the respective projections 33. Incidentally, the abutment portion may be formed like a semicircle extending from the lower surface of the connector end face 46 to the groove 43. In such a case, if the grooves 43 are misaligned with the respective projections 33, they can direct the projections 33 to the respective grooves 43.

Figure 6A:
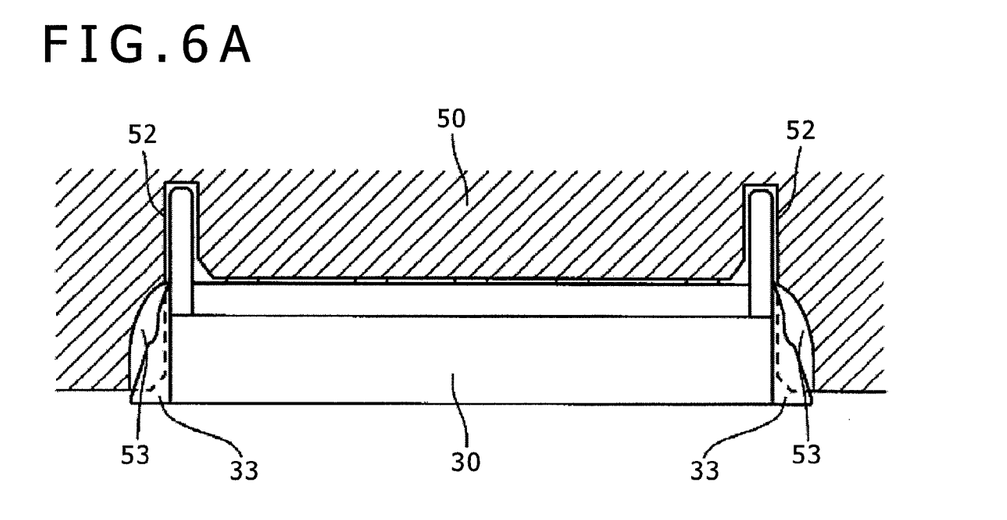
FIG. 6A is a plan view illustrating the relationship between a female connector section and a male connector section according to another embodiment.
Figure 6B:
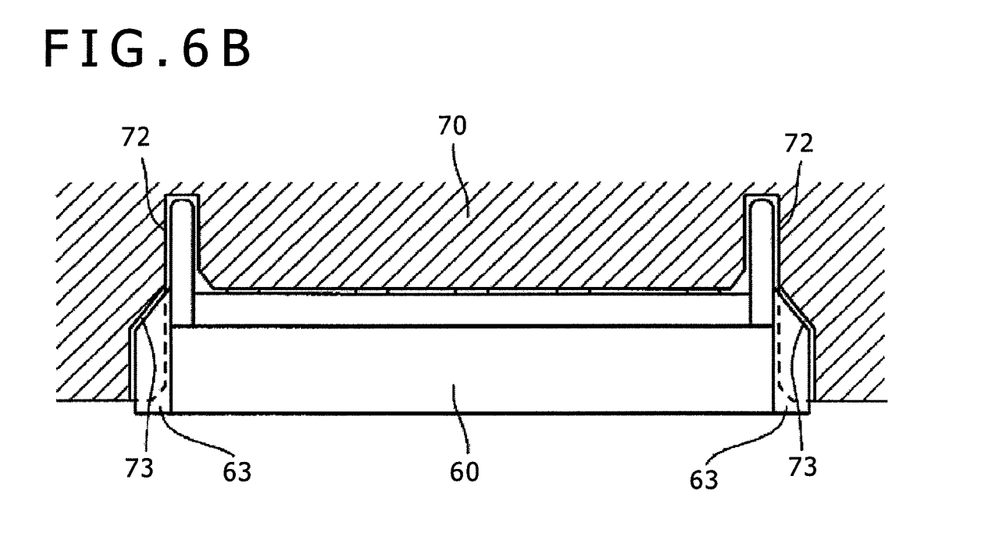
FIG. 6B is a plan view illustrating the relationship between a female connector section and a male connector section according to another embodiment.

FIG. 6A is a plan view illustrating the relationship between a female connector section 50 and a male connector section 30 according to another embodiment. FIG. 6B is a plan view illustrating the relationship between a female connector section 70 and a male connector section 60 according to another embodiment.

A structure is illustrated in FIG. 6A in which the male connector section 30 has the same structure as that of FIG. 4A but a female connector section 50 having another formation is joined to the male connector section 30. The female connector section 50 is formed with grooves 53 in respective inner surfaces of a pair of connector inner walls 52. The grooves 53 are each formed gradually shallower as it goes from the opening side to the deepest side so that the projection 33 provided on the male connector section 30 is fitted into the groove 53. Specifically, the groove 53 is formed to be recessed in a parabolic manner as viewed from above as illustrated in FIG. 6A.

Also such a groove 53 provides the fit between the deep side of the groove 53 and the low side of the projection 33 at first when the female connector section 50 is joined to the male connector section 30. Therefore, even if having a slight displacement therebetween, both can accommodate it. Thus, not only the female connector section 50 and the male connector section 30 can electrically be connected to each other with ease but also the projections 33 fitted into the respective grooves 53 can restrain the part of the male connector section 30.

On the other hand, a structure is illustrated in FIG. 6B in which a female connector section 70 has another formation and a male connector section 60 is formed to conform to the female connector section 70. Referring to FIG. 6B, the groove 73 of the female connector section 70 and the projection 63 of the male connector section 60 are each composed of a straight line and an oblique line both extending in the depth direction as viewed from above. This oblique line makes the groove 73 gradually shallower as it goes toward the deepest side. In addition, the projection 63 is gradually increased in height as it goes toward the deepest side.

Also such a groove 73 and a projection 63 provide the fit between the deep side of the groove 73 and the low side of the projection 63 at first when the female connector section 70 is joined to the male connector section 60. Therefore, even if having a slight displacement therebetween, both can accommodate it. Thus, not only the female connector section 70 and the male connector section 60 can electrically be connected to each other with ease but also the projections 63 fitted into the respective grooves 73 can restrain the part of the male connector section 60.

Figure 7A:
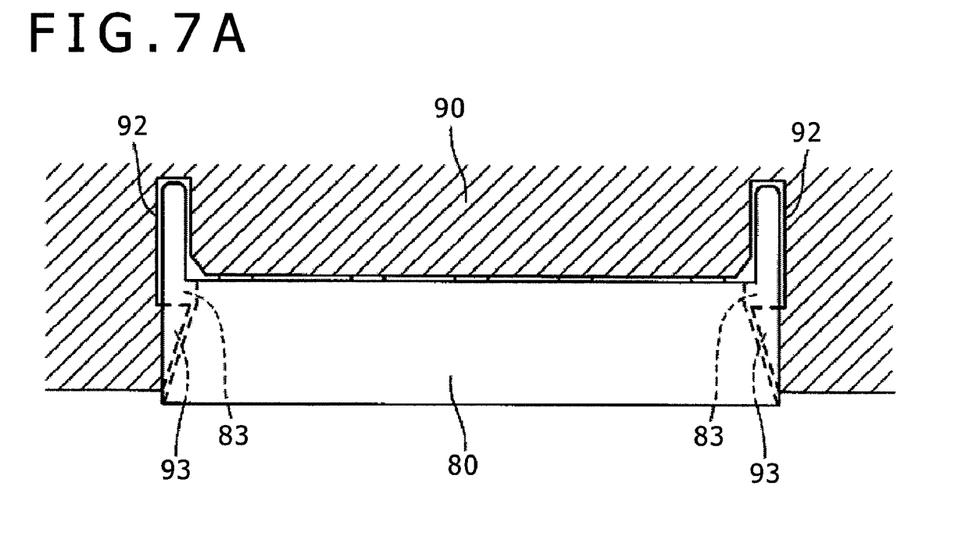
FIGS. 7A and 7B are a plan view and a front view, respectively, illustrating the relationship between a female connector section and a male connector section according to another embodiment.
Figure 7B:
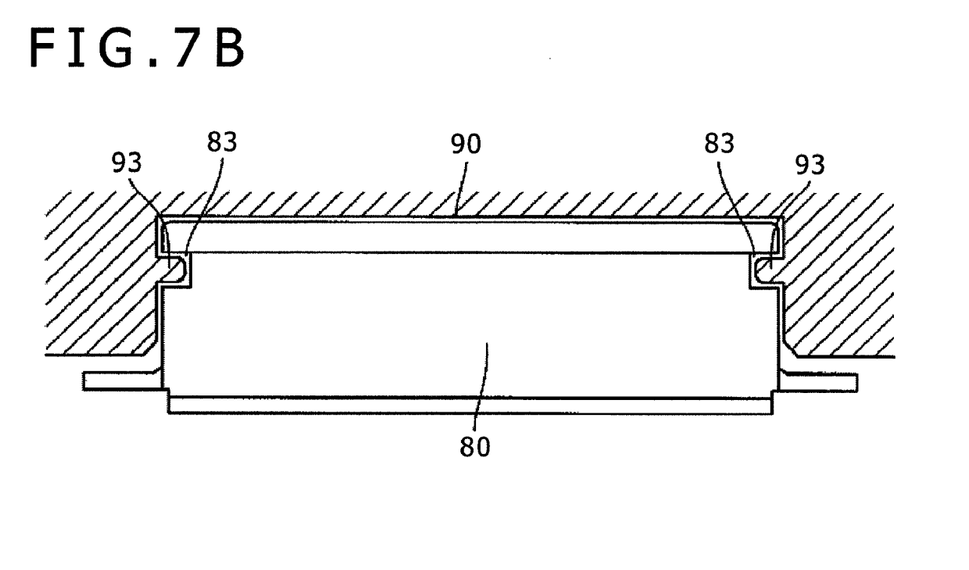

FIGS. 7A and 7B are a plan view and a front view, respectively, illustrating the relationship between a female connector section 90 and a male connector section 80 according to still another embodiment.

The female connector section 90 illustrated in FIGS. 7A and 7B is formed with a pair of projections 93 formed in the respective inner surfaces of connector inner walls 92. In addition, the projections 93 are each gradually increased in height as it goes toward the deepest side in such a manner as to be fitted into the groove 83 provided on the male connector section 80. As illustrated in FIG. 7A, the projection 93 is formed triangular as viewed from above.

Also such a projection 93 and a groove 83 provide the fit between the low side of the projection 93 and the groove 83 at first when the female connector section 90 is joined to the male connector section 80. Therefore, even if having a slight displacement therebetween, both can accommodate it. Thus, not only the female connector section 90 and the male connector section 80 can electrically be connected to each other with ease but also the projections 93 fitted into the respective grooves 83 can restrain the part of the male connector section 80.

Figure 8:
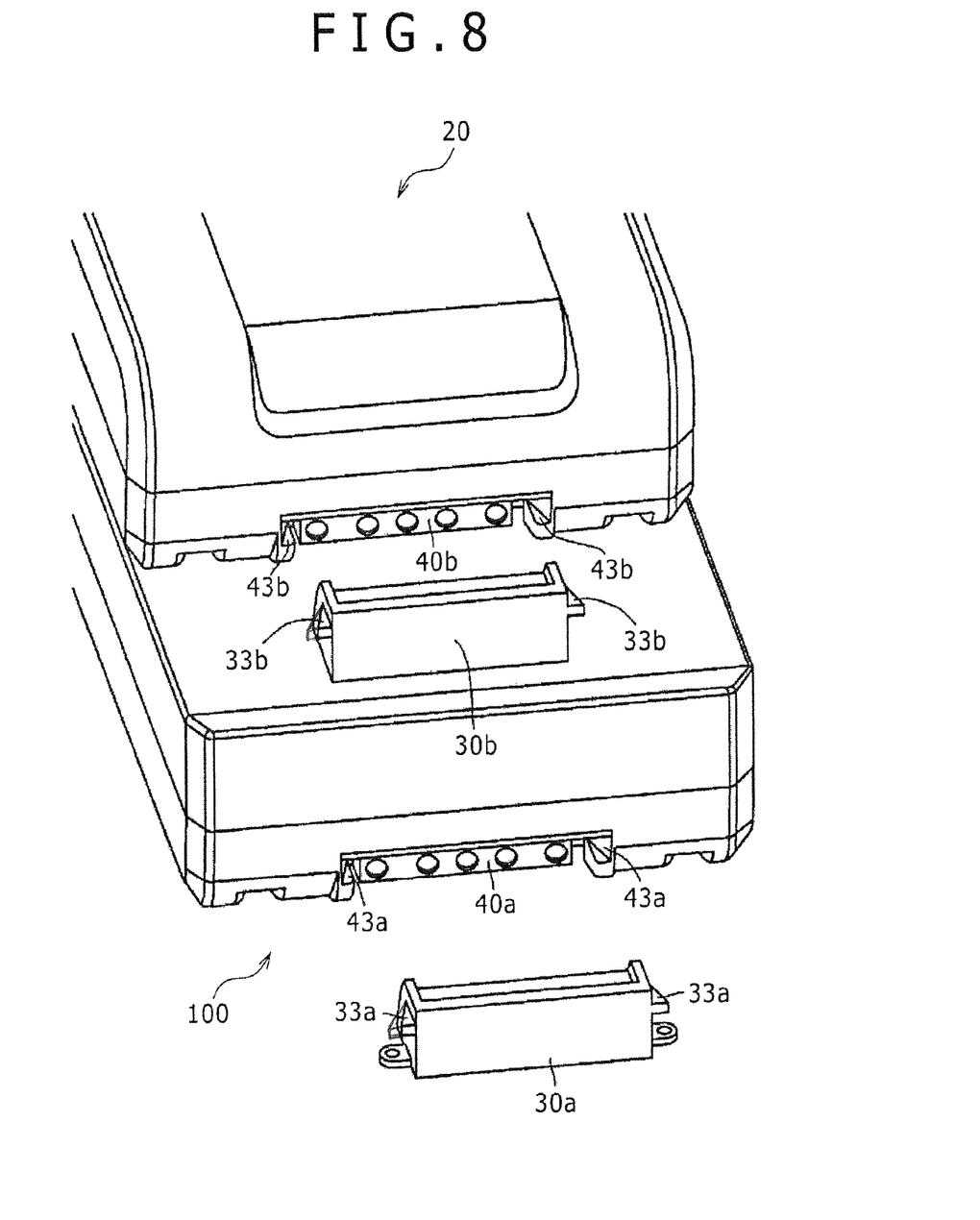
FIG. 8 is a perspective view of an adaptor pack according to another embodiment.

FIG. 8 is a perspective view illustrating an adaptor pack 100 of an embodiment.

The adaptor pack 100 illustrated in FIG. 8 is operative to receive electricity of a commercial power supply and output electricity of the type adjusted to the video camera 10 (FIG. 1). In addition, the adaptor pack 100 is provided with a female connector section 40a removably attachable to a male connector section 30a provided on the video camera 10. Specifically, the female connector 40a has a pair of grooves 43a which are each formed gradually shallower as it goes toward the deepest side so that a projection 33a provided on the male connector section 30a may be fitted to the groove 43a. The male connector section 30a has a pair of the projections 33a which are each increased in height so as to be fitted into the groove 43a provided on the female connector section 40a. Thus, not only the adaptor pack 100 (the female connector section 40a) can be attached to the video camera 10 (the male connector section 30a) with ease but also the projections 33a fitted into the respective grooves 43a can restrain the part of the male connector section 30a.

Further, the adaptor pack 100 is provided with a male connector section 30b on the side opposite the side where the female connector section 40a is provided. The male connector section 30b has a pair of projections 33b which are increased in height so as to be fitted into respective grooves 43b formed in the female connector section 40b of the battery pack 20. Thus, the battery pack 20 (the female connector section 40b) can easily be attached to the adaptor pack 100 (the male connector section 30b). In this way, while electric power is supplied from the adaptor pack 100 to the video camera 10 (FIG. 1), the battery pack 20 can be recharged.

Although the embodiments of the present invention have been described thus far, the present invention is not limited to the above-described embodiments but can be modified in various ways as below for instance.

(1) The grooves 43 of the female connector section 40 are each formed triangular as viewed from the surface parallel to the plane extending through the pin insertion hole 41 in the depth direction thereof. However, as long as the groove is formed shallower as it goes from the opening side of the pin insertion hole 41 toward the deepest side, it may be formed in any of polygonal shapes. Alternatively, the groove may have any shape in which a plurality of straight lines different in inclined angle from each other are connected by curved lines.

(2) The above-described embodiments cite the video camera 10 as an electric device by way of example, wherein the video camera 10 is provided with the male connector section 30 and the battery pack 20 is provide with the female connector section 40. However, the video camera may be provided with the female connector section and the battery pack may be provided with the male connector section. In addition, the male connector section and the female connector section can be applied to various electric devices such as digital camera and mobile phone.

The present application contains subject matter related to that disclosed in Japanese Priority Patent Application JP 2008-166310 filed in the Japan Patent Office on Jun. 25, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A female connector structure comprising:
a plurality of pin insertion holes arranged in a row to correspond to a plurality of columnar connector pins arranged in a male connector section and adapted to receive the respective connector pins individually inserted thereinto, an opening side of the pin insertion hole is formed deeper than another side of the pin insertion hole;
a pair of connector inner walls formed externally of the pin insertion holes of opposite ends so as to extend in a depth direction of the pin insertion holes;
a pair of grooves each formed on an inner surface of the connector inner wall so as to be gradually shallower as the groove goes from an opening side of the pin insertion hole toward a deepest side thereof in such a manner as to receive a projection, fitted thereinto, provided on the male connector section,
wherein the grooves are each formed triangular as viewed from a surface parallel to a plane extending through the pin insertion holes in a depth direction thereof, and
wherein the projection enters a deeper side of the groove and moves toward a shallower side of the groove to electrically connect the male connector section and the female connector, the deep side having a larger gap between the groove and the projection and the shallower side having a small gap between the groove and the projection;
a pair of connector bottom faces which are each located between each of the pin insertion holes of opposite ends and a corresponding one of the connector inner walls so as to extend in an arrangement direction of the pin insertion holes;
wherein the connector bottom faces or the grooves are provided with a second restraining portion adapted to restrain part of the male connector section so as to suppress, to within +/−0.22 mm, the movement of the connector pins in the depth direction of the pin insertion holes in the state where the connector pins are inserted into the respective in insertion holes; and
the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective pin insertion holes.

2. The female connector structure according to claim 1, wherein the grooves are provided with a first restraining portion adapted to restrain, to within +/−0.22 mm, movement of the connector pins in a direction vertically to the plane extending through the pin insertion holes in the depth direction thereof, in the state where the connector pins are inserted into the respective pin insertion holes.

3. The female connector structure according to claim 1, further comprising:
a pair of connector end faces which are formed externally of the pin insertion holes of opposite ends so as to extend in the arrangement direction of the pin insertion holes and each to serve as an end face of the groove;
wherein the connector end faces are each provided with an abutment portion adapted to receive at least one of the projections abutted thereagainst before the connector pins are inserted into the respective pin insertion holes if the grooves and corresponding projections are misaligned with each other.

4. A female connector structure comprising:
a plurality of pin insertion holes arranged in a row to correspond to columnar connector pins arranged in a male connector section and adapted to receive the respective connector pins individually inserted thereinto, an opening side of the pin insertion hole is formed deeper than another side of the pin insertion hole;
a pair of connector inner walls formed externally of the pin insertion holes of opposite ends so as to extend in a depth direction of the pin insertion holes;
a pair of projections each formed in an inner surface of each of the connector inner walls so as to be gradually increased in height as the projection goes from an opening side of the pin insertion holes toward a deepest side thereof in such a manner as to be fitted into a groove formed in the male connector section,
wherein the projections are each formed triangular as viewed from a surface parallel to a plane extending through the pin insertion holes in a depth direction thereof, and
wherein the projection enters a deeper side of the groove and moves toward a shallower side of the groove to electrically connect the male connector section and the female connector, the deep side having a larger gap between the groove and the projection and the shallower side having a small gap between the groove and the projection;
a pair of connector bottom faces which are each located between each of the pin insertion holes of opposite ends and a corresponding one of the connector inner walls so as to extend in an arrangement direction of the pin insertion holes;
wherein the connector bottom faces or the grooves are provided with a second restraining portion adapted to restrain part of the male connector section so as to suppress, to within +/−0.22 mm, the movement of the connector pins in the depth direction of the pin insertion holes in the state where the connector pins are inserted into the respective pin insertion holes; and
the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective pin insertion holes.

5. A male connector structure comprising:
a plurality of columnar connector pins arranged in a row so as to correspond to a plurality of pin insertion holes arranged in a female connector section and adapted to be individually inserted into the respective pin insertion holes, a leading end side of the connector pin is formed lower than another side of the connector pin;
a pair of connector outer walls formed externally of the connector pins of opposite ends so as to extend in a length direction of the connector pins; and
a pair of projections each formed on an external surface of the connector external wall so as to be gradually increased in height as the projection goes from a tip side of the connector pin toward a root side thereof so that the projection is fitted into a groove provided on the female connector section,
wherein the projections are each formed triangular as viewed from a surface parallel to a plane extending through the columnar connector pins in a depth direction thereof, and
wherein the groove is attached to a lower side of the projection and moves toward a higher side of the projection to electrically connect the male connector and the female connector section, the lower side having a large gap between the projection and the groove and the higher side having a small gap between the projection and the groove;
wherein the female connector section comprises:
a pair of connector bottom faces which are each located between each of the pin insertion holes of opposite ends and a corresponding one of the connector inner walls so as to extend in an arrangement direction of the pin insertion holes;
wherein the connector bottom faces or the grooves are provided with a second restraining portion adapted to restrain part of the male connector section so as to suppress, to within +/−0.22 mm, the movement of the connector pins in the depth direction of the pin insertion holes in the state where the connector pins are inserted into the respective pin insertion holes; and
the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective pin insertion holes.

6. A battery comprising:
a battery body serving as an electric power supply for an external electric device; and
a female connector section removably attachable to a male connector section of the electric device and electrically connected to the battery body in a battery pack, the battery pack being provided with the female connector section at a portion of a surface;
wherein the female connector section includes:
a plurality of pin insertion holes arranged in a row to correspond to a plurality of columnar connector pins arranged in a male connector section and adapted to receive the respective connector pins individually inserted thereinto, an opening side of the pin insertion hole is formed deeper than another side of the pin insertion hole, a pair of connector inner walls formed externally of the pin insertion holes of opposite ends so as to extend in a depth direction of the pin insertion holes, and a pair of grooves each formed on an inner surface of the connector inner wall so as to be gradually shallower as the groove goes from an opening side of the pin insertion hole toward a deepest side thereof in such a manner as to receive a projection, fitted thereinto, provided on the male connector section, wherein the grooves are each formed triangular as viewed from a surface parallel to a plane extending through the pin insertion holes in a depth direction thereof, and wherein the projection enters a deeper side of the groove and moves toward a shallower side of the groove to electrically connect the male connector section and the female connector, the deep side having a larger gap between the groove and the projection and the shallower side having a small gap between the groove and the projection;

a pair of connector bottom faces which are each located between each of the pin insertion holes of opposite ends and a corresponding one of the connector inner walls so as to extend in an arrangement direction of the pin insertion holes;

wherein the connector bottom faces or the grooves are provided with a second restraining portion adapted to restrain part of the male connector section so as to suppress, to within +/−0.22 mm, the movement of the connector pins in the depth direction of the pin insertion holes in the state where the connector pins are inserted into the respective pin insertion holes; and the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective pin insertion holes.

7. The battery according to claim 6, wherein the battery body can be rechargeable from an external electric power supply via the female connector section.

8. The battery according to claim 6, wherein the electric device is a video camera.

9. An adaptor comprising:

an adaptor body adapted to receive electricity of a commercial power source supplied thereto and output electricity of a type adjusted to an external electric device; and a female connector section removably attachable to a male connector section of the electric power supply and electrically connected to the adaptor body;

wherein the female connector section includes:

a plurality of pin insertion holes arranged in a row to correspond to a plurality of columnar connector pins arranged in a male connector section and adapted to receive the respective connector pins individually inserted thereinto, an opening side of the pin insertion hole is formed deeper than another side of the pin insertion hole, a pair of connector inner walls formed externally of the pin insertion holes of opposite ends so as to extend in a depth direction of the pin insertion holes, a pair of grooves each formed on an inner surface of the connector inner wall so as to be gradually shallower as the groove goes from an opening side of the pin insertion hole toward a deepest side thereof in such a manner as to receive a projection, fitted thereinto, provided on the male connector section, wherein the grooves are each formed triangular as viewed from a surface parallel to a plane extending through the pin insertion holes in a depth direction thereof, and wherein the projection enters a deeper side of the groove and moves toward a shallower side of the groove to electrically connect the male connector section and the female connector, the deep side having a larger gap between the groove and the projection and the shallower side having a small gap between the groove and the projection;

a pair of connector bottom faces which are each located between each of the pin insertion holes of opposite ends and a corresponding one of the connector inner walls so as to extend in an arrangement direction of the pin insertion holes;

wherein the connector bottom faces or the grooves are provided with a second restrain ion adapted to restrain part of the male connector section so as to suppress, to within +/−0.22 mm, the movement of the connector pins in the depth direction of the pin insertion holes in the state where the connector s are inserted into the respective pin insertion holes; and the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective pin insertion holes.

10. The adaptor according to claim 9, further comprising:

a male connector section removably attachable to a female connector section of a rechargeable battery and electrically connected to the adaptor body;

wherein the male connector section includes:

a plurality of columnar connector pins arranged in a row so as to correspond to a plurality of pin insertion holes arranged in a female connector section and adapted to be individually inserted into the respective pin insertion holes, a pair of connector outer walls formed externally of the connector pins of opposite ends so as to extend in a length direction of the connector pins, and a pair of projections each formed on an external surface of the connector external wall so as to gradually increase in height as the projection goes from a tip side of the connector pin toward a root side thereof so that the projection is fitted into the groove provided on the female connector section.

11. An electric device comprising:

an electrically-driven drive portion; and a male connector section removably attachable with a female connector section of a battery serving as an electric power source and electrically connected to the drive portion;

wherein the male connector section includes:

a plurality of columnar connector pins arranged in a row so as to correspond to a plurality of pin insertion holes arranged in a female connector section and adapted to be individually inserted into the respective pin insertion holes, a leading end side of the connector pin is formed lower than another side of the connector pin, a pair of connector outer walls formed externally of the connector pins of opposite ends so as to extend in a length direction of the connector pins, and a pair of projections each formed on an external surface of the connector external wall so as to be gradually increased in height as the projection goes from a tip side of the connector pin toward a root side thereof so that the projection is fitted into a groove provided on the female connector section, wherein the projections are each formed triangular as viewed from a surface parallel to a plane extending through the columnar connector pins in a depth direction thereof, and wherein the groove is attached to a lower side of the projection and moves toward a higher side of the projection to electrically connect the male connector and the female connector section, the lower side having a large gap between the projection and the groove and the higher side having a small gap between the projection and the groove;

wherein the female connector section comprises:

a pair of connector bottom faces which are each located between each of the pin insertion holes of opposite ends and a corresponding one of the connector inner walls so as to extend in an arrangement direction of the pin insertion holes;

wherein the connector bottom faces or the grooves are provided with a second restraining portion adapted to restrain part of the male connector section so as to suppress, to within +/−0.22 mm, the movement of the connector pins in the depth direction of the pin insertion holes in the state where the connector pins are inserted into the respective pin insertion holes; and the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective in insertion holes.

12. An electric device comprising:

electrically-driven drive means; and male connector means removably attachable with a female connector section of a battery serving as an electric power source and electrically connected to the drive means;

wherein the male connector means includes:

a plurality of columnar connector pins arranged in a row so as to correspond to a plurality of pin insertion holes arranged in a female connector section and adapted to be individually inserted into the respective pin insertion holes, a leading end side of the connector pin is formed lower than another side of the connector pin, a pair of connector outer walls formed externally of the connector pins of opposite ends so as to extend in a length direction of the connector pins, and a pair of projections each formed on an external surface of the connector external wall so as to be gradually increased in height as the projection goes from a tip side of the connector pin toward a root side thereof so that the projection is fitted into a groove provided on the female connector section, wherein the projections are each formed triangular as viewed from a surface parallel to a plane extending through the columnar connector pins in a depth direction thereof, and wherein the groove is attached to a lower side of the projection and moves toward a higher side of the projection to electrically connect the male connector and the female connector section, the lower side having a large gap between the projection and the groove and the higher side having a small gap between the projection and the groove; and wherein the female connector section comprises:

a pair of connector bottom faces which are each located between each of the pin insertion holes of opposite ends and a corresponding one of the connector inner walls so as to extend in an arrangement direction of the pin insertion holes;

wherein the connector bottom faces or the grooves are provided with a second restraining portion adapted to restrain part of the male connector section so as to suppress, to within +/−0.22 mm, the movement of the connector pins in the depth direction of the pin insertion holes in the state where the connector pins are inserted into the respective pin insertion holes; and the connector inner walls or the grooves are provided with a third restraining portion adapted to restrain part of the male connector section so as to suppress, to within +/−0.22 mm, the movement of the connector pins in the arrangement direction of the pin insertion holes in the state where the connector pins are inserted into the respective pin insertion holes.

\* \* \* \* \*